United States Patent [19]

Iino

[11] 4,236,163
[45] Nov. 25, 1980

[54] THERMAL RECORDING STYLUS

[75] Inventor: Kinzo Iino, Tokyo, Japan

[73] Assignee: Watanabe Sokki Kabushiki Kaisha, Tokyo, Japan

[21] Appl. No.: 80,115

[22] Filed: Sep. 28, 1979

[30] Foreign Application Priority Data

Oct. 6, 1978 [JP] Japan .......................... 53-137662[U]

[51] Int. Cl.³ ............................................ G01D 15/10
[52] U.S. Cl. ................................ 346/139 C; 346/76 R
[58] Field of Search ................... 346/76 R, 139 C; 219/237

[56] References Cited

U.S. PATENT DOCUMENTS

| 3,811,030 | 5/1974 | Veach | 346/76 R X |
| 3,969,606 | 7/1976 | Veach | 219/237 |
| 4,027,311 | 5/1977 | Ambrosio | 346/76 R |
| 4,168,505 | 9/1979 | Gaskill, Jr. | 346/139 C |

*Primary Examiner*—George H. Miller, Jr.
*Attorney, Agent, or Firm*—Spensley, Horn, Jubas & Lubitz

[57] ABSTRACT

A thermal recording stylus has a recording head made of Type IIa diamond. The type IIa diamond has a very good heat conductivity and an excellent abrasion-resistant property. Therefore, the thermal recording stylus with the recording head made of Type IIa diamond has an improved thermal response character, a higher resolution in drawing a line, and a longer life.

5 Claims, 7 Drawing Figures

THERMAL RECORDING STYLUS

BACKGROUND OF THE INVENTION

The present invention relates to a thermal recording stylus for recording on a thermal recording paper.

Recently a thermal recording system has become extensively used as a substitute for a pen-and-ink recording system in such a field as an analog recorder for a measuring instrument. A quick thermal response character, a fine resolution in drawing a line, and an excellent abrasion-resistant property are required for the recording head of a thermal recording stylus. For the purpose of improving the abrasion-resistant property, an abrasion-resistant layer made of glass mixed with powder of such crystallized $Al_2O_3$ as sapphire or ruby, has hitherto been used for the coating of the recording head. But the abrasion-resistant property of this type of the recording head has not been satisfactory, and this type of the recording head can be used to record a maximum of about 500 km line length when used under a stylus pressure of 20 g on the recording paper. And the heat conductivity of this abrasion-resistant layer is comparatively poor, and is in the order of 0.0016–0.0034 cal/cm$^2$. sec.°C. when the layer is made of glass mixed with powder of the crystallized $Al_2O_3$. This poor heat conductivity has been the cause of the slow thermal response character of the heretofore known thermal recording stylus at the switching-on and switching-off transients of the heating power to the thermal recording stylus.

SUMMARY OF THE INVENTION

Therefore, the important object of this invention is to eliminate the demerits described in the foregoing paragraph on the heretofore known apparatus and to provide a thermal recording stylus having a quick thermal response character and an excellent abrasion-resistant property.

Other and further objects, features and advantages of the invention will appear more fully from the following description taken in connection with the accompanying drawings.

DESCRIPTION OF THE PREFERRED EMBODIMENT

Figure 1:
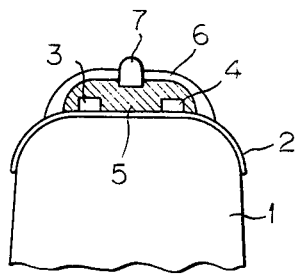
FIG. 1 is a cross-sectional view of an embodiment of this invention.

Referring now to FIG. 1, there is shown a cross-sectional view of an embodiment of this invention. One end of a supporting member 1 is coated with a heat insulating layer 2. For example, the supporting member 1 is made of a ceramic substance. A pair of terminals 3, 4 is provided on the heat insulating layer 2. These terminals 3, 4 are connected to a power supply by wires (not shown in the drawing) through the supporting member 1.

An electric heater 5 is formed on the surface of the heat insulating layer 2, and the electric power is supplied through the terminals 3, 4 to the electric heater 5 which may be a resistance wire heater, a thin film heater, a thick film heater, or a semiconductor heater.

An abrasion-resistant layer 6 is formed on the electric heater 5 to make up a space between the heat insulating layer 2; and in this space, the terminals 3, 4 and the electric heater 5 are accomodated. The abrasion-resistant layer 6 may be made of glass mixed with powder of the crystallized $Al_2O_3$. A recording head 7 of this invention is made of Type IIa diamond, and is shaped, to a cylindrical form. The real diameter of the cylinder of the recording head 7 is about 0.1–0.3 mm although all the dimensions are shown is a proportionately enlarged scale in FIG. 1. The one end of the recording head 7 is protruded from the abrasion-resistant layer 6, and forms the recording tip which moves in contact with the surface of a thermal recording paper (not shown in the drawing). The other end of the recording head 7 is, in this embodiment, embedded in the heat generating substance of the electric heater 5.

It is well known that Type IIa diamond has a very good heat conductivity (5–10 times of the heat conductivity of copper, that is, about 3–5 cal/cm$^2$. sec.°C.) and an excellent abrasion-resistant property. Therefore, the thermal recording stylus of this invention shows a very quick thermal response character at the switching-on and switching-off transients of the heating power, since the heat conductivity is increased to 3–5 cal/cm$^2$. sec.°C. from 0.0016–0.0034 cal/cm$^2$. sec.°C. of the heretofore known thermal recording stylus described in the foregoing paragraph; and can be used to record a maximum of about 2.000 km line length under a stylus pressure of 20 g on the recording paper as compared to a maximum of about 500 km line length of the heretofore known thermal recording stylus described in the foregoing paragraph, because of the excellent abrasion-resistant property of Type IIa diamond.

Figure 2:
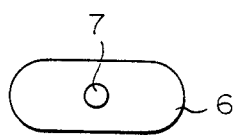
FIG. 2 is a plan view of the recording head of the embodiment shown by FIG. 1.

As shown by FIG. 1 and FIG. 2, the recording tip of the recording head 7 has a spherical shape with a very small area for the contact to a recording paper, the recording tip can draw a very fine line (about 0.15 mm width) and the resolution in drawing a line is the same in any direction of the relative motion between the recording tip and the recording paper. And since the heat conductivity of the recording head 7 is very good, the temperature of all the portions of the recording head 7 is the same, and therefore, the recording tip can draw a line of uniform thickness without any blur or shading-off.

A few minor modifications of the embodiment shown by FIG. 1 will be described in connection with the drawings. In all these drawings, the same numerals used in FIG. 1 indicate the same or the like parts.

Figure 3:
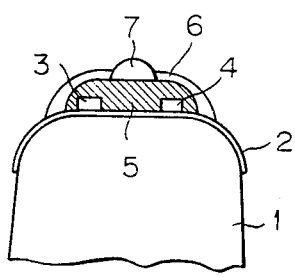
FIG. 3 is a cross-sectional view of another embodiment of this invention.

In an embodiment shown by FIG. 3, the recording head 7 made of Type IIa diamond has a spherical head and a flat face. The flat face of the recording head 7 is in contact with the heat generating substance of the electric heater 5. As the heat conductivity of the recording head 7 is very good, the generated heat is easily conducted to the recording head 7 through this contact; and when the power to the electric heater 5 is switched-off, the recording head 7 is quickly cooled by the ambient air.

Figure 4:
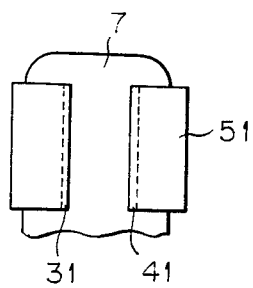
FIG. 4 shows an enlarged front view of a recording head and an electric heater of an embodiment of this invention.
Figure 5:
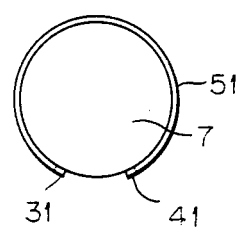
FIG. 5 is the plan view of the embodiment shown by FIG. 4.

In FIG. 4 and FIG. 5, another embodiment of the recording head 7 is shown in a further enlarged scale. The terminals 31, 41 correspond to terminals 3, 4 in FIG. 1, and a thin resistance layer 51 is formed on the cylindrical surface of the recording head 7 by printing or by evaporation coating.

Figure 6:
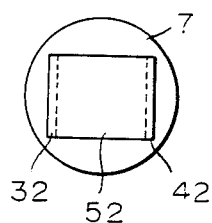
FIG. 6 is a bottom plan view of a recording head and an electric heater of another embodiment of this invention.

In FIG. 6, terminals 32, 42 which correspond to terminals 3, 4 in FIG. 1 are formed on the flat surface of the other end of the recording head 7. Between these terminals 32, 42, a thin resistance layer 52 is formed by printing or by evaporation coating.

Figure 7:
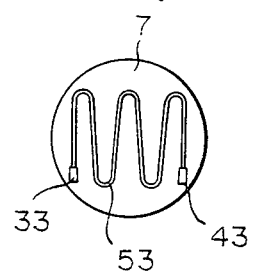
FIG. 7 is a bottom plan view of a recording head and an electric heater of still another embodiment of this invention.

In FIG. 7, terminals 33, 43 which correspond to terminals 32, 42 in FIG. 6, are formed on the flat face of the other end of the recording head 7. Between these terminals 33, 43 a thin resistance strip 53 is formed by printing or by evaporation coating.

In all these embodiments shown in FIG. 4, FIG. 5, FIG. 6, and FIG. 7, the size of the heat generating substance of the electric heater can be made extremely small. Thereby, the combined thermal capacity of the recording head 7 and the electric heater is sharply reduced, and the thermal response character of the recording head 7 is further improved.

Although the invention has been described in its preferred embodiments, various changes and modifications may be made without departing from the spirit and the scope of the invention.

I claim:

1. A thermal recording stylus comprising:

a supporting member having an end coated with a heat insulating layer;

an abrasion-resistant layer formed above said heat insulating layer for making up a space between said heat insulating layer and said abrasion-resistant layer;

an electric heater provided in said space between said heat insulating layer and said abrasion-resistant layer; and a recording head made of Type IIa diamond, having one end protruded from said abrasion-resistant layer, and having a portion embraced in said space between said heat insulating layer and said abrasion-resistant layer to make a heat conductive contact with said electric heater.

2. A thermal recording stylus in accordance with claim 1 wherein said recording head made of Type IIa diamond have a portion embedded in the heat generating substance of said electric heater.

3. A thermal recording stylus in accordance with claim 1 wherein said recording head made of Type IIa diamond have a portion in which the surface of the other end of said recording head is in contact with the surface of the heat generating substance of said electric heater.

4. A thermal recording stylus in accordance with claim 1 wherein said recording head made of Type IIa diamond has a cylindrical surface on which the heat generating substance of said electric heater is formed by printing or by evaporation coating.

5. A thermal recording stylus in accordance with claim 1 wherein said recording head made of Type IIa diamond has a flat surface on which the heat generating substance of said electric heater is formed by printing or by evaporation coating.

* * * * *